US007842731B2

(12) United States Patent
Eckert et al.

(10) Patent No.: US 7,842,731 B2
(45) Date of Patent: Nov. 30, 2010

(54) WAX EMULSION FOR MANUFACTURE OF COMPOSITE BOARDS

(75) Inventors: James Eckert, Hamilton, NJ (US); John Burns, Gap, PA (US)

(73) Assignee: Henry Company, El Segundo, CA (US)

( * ) Notice: Subject to any disclaimer, the term of this patent is extended or adjusted under 35 U.S.C. 154(b) by 128 days.

(21) Appl. No.: 11/436,415

(22) Filed: May 18, 2006

(65) Prior Publication Data

US 2006/0264519 A1 Nov. 23, 2006

Related U.S. Application Data

(60) Provisional application No. 60/684,315, filed on May 24, 2005, provisional application No. 60/683,215, filed on May 20, 2005.

(51) Int. Cl.
*B01F 3/10* (2006.01)
*C08L 91/08* (2006.01)

(52) U.S. Cl. .......................................................... 516/41

(58) Field of Classification Search .................... 516/41
See application file for complete search history.

(56) References Cited

U.S. PATENT DOCUMENTS

| | | | | | |
|---|---|---|---|---|---|
| 3,748,222 | A * | 7/1973 | Wheeler | ..................... | 162/165 |
| 4,468,254 | A * | 8/1984 | Yokoyama et al. | .......... | 106/271 |
| 5,437,722 | A * | 8/1995 | Borenstein | .................. | 106/778 |
| 5,695,553 | A * | 12/1997 | Claret et al. | ................ | 106/778 |
| 6,113,729 | A * | 9/2000 | Chiu | .......................... | 156/296 |
| 6,183,849 | B1 * | 2/2001 | Lindsay et al. | ........... | 428/292.4 |
| 6,297,313 | B1 * | 10/2001 | Hsu | ........................... | 524/542 |

OTHER PUBLICATIONS

Virgil B. Guthrie, Petroleum Products Handbook, 1960, McGraw-Hill Book Company, Inc., First edition, p. 10-13.*

* cited by examiner

*Primary Examiner*—Ling-Siu Choi
*Assistant Examiner*—Chun-Cheng Wang
(74) *Attorney, Agent, or Firm*—Flaster/Greenberg P.C.

(57) ABSTRACT

Wax emulsions useful for manufacture of a composite board are described which include water; a lignosulfonic acid or a salt thereof; and at least one wax selected from the group consisting of slack wax, paraffin wax and montan wax. Such emulsions are useful in composite board formulations and methods for making composite boards such as oriented strand boards.

17 Claims, No Drawings

WAX EMULSION FOR MANUFACTURE OF COMPOSITE BOARDS

CROSS-REFERENCE TO RELATED APPLICATIONS

This application claims the benefit under 35 U.S.C. 119(e) of U.S. Provisional Patent Application No. 60/684,315, filed May 25, 2005 and U.S. Provisional Patent Application No. 60/683,215, filed May 20, 2005.

BACKGROUND OF THE INVENTION

Various types of engineered wood composites, such as flakeboard, waferboard, particle board, and strand board are known and used in construction applications. Strand board, particularly oriented strand board, has enjoyed success as a building material since its introduction to market in approximately 1981. Such composite products which are made from lignocellulosic materials include "composite boards", which include oriented strand board (OSB), wafer board, straw board, fiber board, chip board and particle board. The board substrate can be prepared by applying an adhesive to lignocellulosic particles, chips or fibers, specifically wood particles, wood chips and lignocellulosic particles, and subsequently forming the lignocellulosic material into the desired board through application of heat and pressure.

Oriented strand board is produced from secondary wood material that is reduced to flat strands, which are then reconsolidated into durable panels of high mechanical properties. Production of oriented strand board and other wood composites requires the creation of durable bonds between and among the flat strands using synthetic adhesives, waxes or modifiers as well as a considerable amount of effort and energy to bond the particles together and provide high mechanical properties, strength, dimensional stability, and durability. This is accomplished in conventional practice though mixing of strands and adhesives and application of heat and pressure to form the board.

Small variations in the process parameters of the binding protocol may greatly affect properties of the end product strand board. Additionally, small improvements and innovation in the area of oriented strand board may lead to significant production cost savings, improved process efficiency and safety, as well as the manufacture of improved products.

In the conventional practice used in the manufacture of oriented strand board, resin, which acts as an adhesive is sprayed on flat strands in revolving blenders through conventional nozzles. The resin acts as a waterproofing and adhesive component. Small amounts of wax, which may be in emulsion form (generally about 1.5% by weight or less on a solids basis) are used as well. Resin droplets are atomized into the strand board components during manufacture in a conventional manner using a spinning disk sprayer.

Adhesives currently used in the manufacturer of various wood composite products include urea-formaldehyde, phenol-formaldehyde, melamine-urea-formaldehyde, melamine-formaldehyde resins, and certain isocyanate polymers. Examples of resins which are used in the art of oriented strand board manufacture include phenyl formaldehyde (novolaks and resoles) and poly(diphenylmethane diisocyanate) (pMDI). The resin is applied first and the wax emulsion applied separately.

Commercial wax emulsions used in the oriented strand board industry are known to include slack wax and fatty acid soaps and non-ionic emulsifiers. One commercially used example includes Cascowax EW-58A from Borden Chemicals. Generally, due to lack of compatibility between prior wax emulsions and the resins used, such prior art wax emulsions based on fatty acid and base emulsifiers separate into wax and water when mixed with either type of resin usually causing plugging of lines, requiring separate application. One prior emulsion prepared by Mobil Oil based on a complex blend of emulsifiers, demonstrated compatibility with phenol formaldehyde, but was expensive for oriented strand board production.

In manufacturing oriented strand board there are several key properties necessary to achieve acceptable properties, including low edge swell and water absorption as well as strong internal bond strength and good flexural stiffness and flexural strength.

There exists a need in the art for a manufacturing process and/or composition for forming composite wood panels, such as oriented strand board, that is comparable to properties achieved by prior wax emulsions used in the art and/or improves upon such properties, while lowering the cost of manufacture and preferably also simplifying the application of resins and wax emulsions in the composite board manufacturing procedure.

BRIEF SUMMARY OF THE INVENTION

The invention includes a wax emulsion useful for manufacture of a composite board, which comprises (a) water; (b) a lignosulfonic acid or a salt thereof; and (c) at least one wax selected from the group consisting of slack wax, paraffin wax and montan wax.

A wax emulsion is also included in the invention which is useful for manufacture of a composite board, and which comprises (a) water; (b) a lignosulfonic acid or a salt thereof; (c) potassium hydroxide; (d) polyvinyl alcohol; and (c) at least one wax selected from the group consisting of slack wax, paraffin wax and montan wax.

In one embodiment, the invention includes a wax emulsion useful for manufacture of a composite board, that comprises: (a) about 30% to about 60% by weight of water; (b) about 0.1% to about 5% by weight of a lignosulfonic acid or a salt thereof; (c) about 0% to about 1% by weight of potassium hydroxide; (d) about 40% to about 50% by weight of wax selected from the group consisting of paraffin wax, slack wax and combinations thereof; and (e) about 0.1% to about 10% montan wax.

A method for making composite board is also within the scope of the invention. The method comprises (a) forming a composite board formulation comprising a wax emulsion, at least one resin and a lignocellulosic material; (b) compressing the composite board formulation under heat and pressure to form a composite board, wherein the wax emulsion comprises water; a lignosulfonic acid or a salt thereof; and at least one wax selected from the group consisting of slack wax, paraffin wax and montan wax.

In addition, a formulation for forming a composite board, is included herein which comprises (a) a lignocellulosic material; (b) a wax emulsion comprising water; a lignosulfonic acid or a salt thereof; and at least one wax selected from the group consisting of slack wax, paraffin wax and montan wax; and (c) at least one resin selected from the group consisting of urea-formaldehyde, phenol-formaldehyde, melamine-urea-formaldehyde, melamine-formaldehyde resins, polymeric isocyanates and combinations, copolymers and derivatives thereof.

DETAILED DESCRIPTION OF THE INVENTION

As noted, wax emulsions are described herein within the scope of the invention which are useful for manufacture of composite boards formed from lignocellulosic materials. Composite boards include, for example, materials such as medium density fiber board, hardboard, particle board, chip board, timber strand, plywood and oriented strand board. Lignocellulosic materials which may be used to manufacture such composite boards include, for example, wood strands, wood chips, wood fibers, shavings, veneers, wood wool, cork, bark, sawdust and similar waste products of the woodworking industry as well as other materials of lignocellulosic basis. While these and other composite boards and lignocellulosic materials known in the art or to be developed may be used within the scope of the invention, it is preferred that the composite board be oriented strand board derived from typical sources, such as wood chips and other forms of furnish. For the purpose of describing and best illustrating the wax emulsions herein, the invention will be described with respect manufacture of orient strand board. However, it will be understood based on this disclosure that the wax emulsions may be used in other types of composite board manufacturing.

The wax emulsions described herein are useful for manufacture of composite board such as oriented strand board. The wax emulsion include water, lignosulfonic acid or a salt thereof and at least one wax selected from the group consisting of slack wax, paraffin wax and montan wax. The waxes may be used individually or in combinations. Water is preferably provided to the emulsion in amounts of about 30% to about 60% by weight of the emulsion. The solids content of the wax emulsion is preferably about 40% to about 70% by weight of the emulsion.

The lignosulfonic acid component may be used as is and a salt or other similar component may be used to modify the acid, or, more preferably, the lignosulfonic acid may be used in its salt form. The lignosulfonic acid or salt thereof functions as a dispersant in the emulsion. Similar components performing in a manner equivalent to the lignosulfonic acid or its salt may be used as substitutes therefor provided that the edge swell, water absorption, internal bonding and flexural strength properties of the resultant boards are not materially effected and the resultant boards are acceptable for use as industry acceptable oriented strand board (or other composite board). Preferably the lignosulfonic acid is present in the emulsion in amount of about 0.1% to about 5% by weight of the emulsion. A preferred lignosulfonic acid salt is Polyfon® H available from MeadWestvaco Corporation, Charleston, S.C., which is 0.7 mole percent sulfonated.

The wax component of the emulsion includes at least one wax which may be slack wax, montan wax and/or slack wax. The total wax content should be about 40% to about 60%, more preferably about 43% to about 55% by weight of the emulsion. Slack wax may be any suitable slack wax known or to be developed which incorporates a material that is a higher petroleum refining fraction of generally up to about 20% by weight oil. In addition to, or as an alternative to slack wax, paraffin waxes of a more refined fraction are also useful within the scope of the invention.

Suitable paraffin waxes may be any suitable paraffin wax, and preferably paraffins of melting points of from about 40° to about 110° C. Although lower or higher melting points are acceptable if drying conditions are altered accordingly using any techniques known in the composite board manufacturing arts. Thus, petroleum fraction waxes, either paraffin or microcrystalline, and which may be either in the form of varying levels of refined paraffins, or less refined slack wax may be used. It is also possible to include synthetic waxes such as ethylenic polymers or hydrocarbon types derived via Fischer-Tropsch synthesis as well, however paraffins or slack waxes are preferred.

Montan wax, which is also known in the art as lignite wax, is a hard, naturally occurring wax that is typically dark to amber in color (although lighter, more refined montan waxes are also commercially available). Montan is insoluble in water, but is soluble in solvents such as carbon tetrachloride, benzene and chloroform. In addition to naturally derived montan wax, alkyl acids and/or alkyl esters which are derived from high molecular weight fatty acids of synthetic or natural sources with chain lengths preferably of over 18 carbons, more preferably from 26 to 46 carbons that function in a manner similar to naturally derived montan wax are also within the scope of the invention and are included within the scope of "montan wax" as that term is used herein. Such alkyl acids are generally described as being of formula R—COOH, where R is an alkyl non-polar group which is lipophilic and can be from 18 to more than 200 carbons. An example of such as material is octacosanoic acid and its corresponding ester which is, for example, a di-ester of that acid with ethylene glycol. The COOH group forms hydrophilic polar salts in the presence of alkali metals such as sodium or potassium in the emulsion. Such alkyl acids are to be adsorbed onto the surface of the wax particles providing stability in the emulsion in the aqueous phase. Other components which may be added include esterified products of the alkyl acids with alcohols or glycols.

In one preferred embodiment the at least one wax component of the emulsion includes primarily and, preferably completely a slack wax component. In alternative preferred embodiments, the at least one wax component is made up of a combination of paraffin wax and montan wax or of slack wax and montan wax. Although it should be understood that varying combinations of such waxes can be used. When using montan wax in combination with one or more of the other suitable wax components, it is preferred that montan be present in an amount of about 0.1% to about 10%, more preferably about 1% to about 4% by weight of the wax emulsion with the remaining wax or waxes present in amounts of from about 40% to about 50%, more preferably about 40% to about 45% by weight of the wax emulsion.

While optional, it is preferred that the wax emulsion includes polyvinyl alcohol of any suitable grade which is at least partially hydrolyzed. The preferred polyvinyl alcohol is at least 80%, and more preferably at least 90%, and most preferably about 97-100% hydrolyzed polyvinyl acetate. Suitably, the polyvinyl alcohol is soluble in water at elevated temperatures of about 60° C. to about 95° C., but insoluble in cold water. The hydrolyzed polyvinyl alcohol is preferably included in the emulsion in an amount of up to about 5% by weight, preferably 0.1% to about 5% by weight of the emulsion, and most preferably about 2% to about 3% by weight of the wax emulsion.

Another preferred, but optional component in the wax emulsion is potassium hydroxide or other suitable metallic hydroxide, such as aluminum, barium, calcium, lithium, magnesium, sodium and/or zinc hydroxide. However, potassium hydroxide is preferred. If included in the wax emulsion, potassium hydroxide is preferably present in an amount of 0% to 1%, more preferably about 0.1% to about 0.5% by weight of the wax emulsion.

Based on the foregoing, an exemplary wax emulsion useful for manufacture of a composite board, such as oriented strand board includes a wax emulsion as listed below:

about 30% to about 60% by weight of water;

about 0.1% to about 5% by weight of a lignosulfonic acid or a salt thereof;

about 0% to about 1% by weight of potassium hydroxide;

about 40% to about 50% by weight of wax selected from the group consisting of paraffin wax, slack wax and combinations thereof; and about 0.1% to about 10% montan wax.

Such formulation may also include 0.1 to 5% by weight of polyvinyl alcohol in alternate embodiments.

The wax emulsion may further include other additives, including without limitation additional emulsifiers and stabilizers typically used in wax emulsions, flame retardants, lignocellulosic preserving agents, fungicides, insecticides, biocides, waxes, sizing agents, fillers, binders, additional adhesives and/or catalysts. Such additives are preferably present in minor amounts and are provided in amounts which will not materially affect the resulting composite board properties. Preferably no more than 30% by weight, more preferably no more than 10%, and most preferably no more than 5% by weight of such additives are present in the wax emulsion.

The wax emulsion may be prepared using any acceptable techniques known in the art or to be developed for formulating wax emulsions, for example, the wax(es) are preferably heated to a molten stated and blended together (if blending is required). A hot aqueous solution is prepared which includes any additives such as emulsifiers, stabilizers, etc., polyvinyl alcohol (if present), potassium hydroxide (if present) and lignosulfonic acid or any salt thereof. The wax is then metered together with the aqueous solution in appropriate proportions through a colloid mill or similar apparatus to form a wax emulsion, which may then be cooled to ambient conditions if desired.

A method for making composite board is described herein based on the above-described wax emulsion and preferred embodiments thereof. The method includes forming a composite board formulation comprising a wax emulsion, at least one resin and a lignocellulosic material, and compressing the composite board formulation under heat and pressure to form a composite board.

The wax emulsion and the at least one resin are preferably mixed together prior to applying the wax emulsion and the at least one resin simultaneously to the lignocellulosic material.

The at least one resin may includes one or more resins commonly used or to be developed in the composite board manufacturing arts as a composite board waterproofing and/or adhesive material. Suitable resins include urea-formaldehyde, phenol-formaldehyde, melamine-urea-formaldehyde, melamine-formaldehyde resins, polymeric isocyanates and combinations, copolymers and derivatives thereof. Exemplary composite board resins are described in U.S. Pat. No. 6,297,313, incorporated in relevant part herein by reference. Most preferably, the resins used are phenol-formaldehyde and/or poly(diphenylmethane diisocyanate).

The wax emulsions hereof are of such consistency and properties, particularly when using a preferred embodiment incorporating paraffin and montan waxes together which is available as a composition similar to Aqualite® 72 from Henry Company of California, that they can be premixed with the composite board resins prior to application. Other commercially available waxes used in manufacturing oriented strand board are not capable of being mixed and delivered in admixture with the resin components. Instead, when fed through a sprayer, nozzle or atomizer, attempted admixtures of other wax emulsions and resin components separate, clogging the delivery device. Instead, the wax emulsions herein may be admixed with the resin components and more uniformly distributed simultaneously through a single spraying apparatus head, atomizer, nozzle or similar device. This presents a significant manufacturing advantage which is a result of the property and nature of the wax emulsions described within the scope of the invention herein. Other process conditions, temperatures and pressures for forming the composite board (for application and compression) are the same as those conventionally used in the art, but can be varied as desired by such oriented strand or other composite board manufacturers without affecting the scope of the invention described herein.

The wax emulsions may be used in making formulations for use in forming composite board. The formulations preferably include a lignocellulosic material, such as those described about, the wax emulsions as described herein, and at least one resin such as urea-formaldehyde, phenol-formaldehyde, melamine-urea-formaldehyde, melamine-formaldehyde resins, polymeric isocyanates and combinations, copolymers and derivatives thereof or the other resins noted herein.

The invention will now be described with respect to the following non-limiting examples:

EXAMPLE 1

Flakeboard containing wax emulsions as described hereinabove as well as a control wax were manufactured on a laboratory scale using aspen flakes and two resin-adhesives (phenol-formaldehyde and poly(diphenylmethane diisocyanate) (pMDI). The boards were evaluated using standard physical property tests as set forth in ASTM D 1037, including flexural strength, internal bond strength, thickness swell and water absorption after a 24 hour soak test. The data were statistically analyzed to determine whether differences existed among the various measured properties. The board panels were formed from quaking aspen (*Populus tremuloides*) flakes using either phenol-formaldehyde in powder form from Dynea or pMDI liquid from Huntsman. Each sample included quaking aspen from LP Company in flake form having 95% solids content. The control sample included as a wax emulsion, Cascowax EW-58A ("E-Wax") from LP Company having 58% solids content. Samples 1 and 2 included the following wax emulsions in weight percent of the wax emulsion with the solids contents listed below in Table 1:

TABLE 1

| | Sample No. | |
|---|---|---|
| | 1 | 2 |
| Water | 42.5 | 42.5 |
| Polyvinyl Alcohol | 2.5 | 2.5 |
| Polyfon ® H | 1.0 | 1.0 |
| Indrawax ® 033 slack wax | 55.0 | — |
| Indrawax ® 021 | — | 55 |

The panels were formed by combining pMDI and the wax emulsion into the flakes separately by using a spinning-disk atomizer in a laboratory rotating drum blender. Powdered phenol-formaldehyde resin was added manually to the flakes in a drum blender following wax application to the flakes.

Flakeboards formed using the two different resins had different moisture contents (5% for pMDI and 7% for phenol-formaldehyde). The resin application rate of both resins was 2.5% based on the flake oven-dry weight. All of the wax emulsions were applied to the flakes at 1.0% solids content, based on the flake oven-dry weight, and the wax coverage for the E-wax sample and for Sample 2 were 0.8% solids content by dry flake weight.

In total, 16 formulations were used to prepare panels at a target density of 40 lbs/ft Three panel replications per formulation were produced (24 in×24 in×0.5 in) through hand-laying up flakes into a random mat in a fixed frame deckle box on a metal caul plate, followed by compressing the mat using a manually controlled, electronic-heated hot press. The hot pressing schedule varied from 0 to 255 seconds at pressures varying from 0 to 2500 lb. After pressing, 42 panels were cut into test specimens of varying size according to tests set forth in ASTM D11037-99. Those specimens were dry-conditioned at a relative humidity of 65±2% and a temperature of 68±6° F. for 2 weeks.

Flexural or static bending tests (including modulus of rupture ("MOR") and modulus of elasticity ("MOE"), internal bonding (IB) test, water absorption (WA) and thickness swell (TS) test (2-hour and 22-hour) were evaluated according to ASTM D 1037-99.

Evaluation of the test data revealed that for each group of both pMDI and phenol-formaldehyde resin specimens, the WA and TS values showed increases between 2 hour and 24 hours soaking in water, indicating that WA and TS are time-dependent. The increased values among different groups with different formulations were not the same for both 2 hour and 24 hours. In addition, different wax formulations had different effects on the pMDI and phenol formaldehyde specimens, respectively. The WA and TS of the pMDI specimens with most types of wax emulsions were lower than those of the phenol formaldehyde specimens after 2 hours and 24 hours submersion in water. In the pMDI specimens the WA and TS of formulations having Sample 2 were statistically similar to that of the control E-Wax. In the phenol formaldehyde specimens, the formulation having Sample 2 performed best compared to the other flakeboard formulations with a WA and TS of only 3.1% and 1.5% after 2 h and 16.5% and 8.6% after 24 hours. The WA and TS of the reference panels was 16.3 and 22.5 times after 2 hour and 4.0 and 6.5 times after 24 hours more than the Sample 2 formulation panel.

The MOR and MOE data showed that Samples 1 and 2 were statistically similar to E-Wax for both pMDI and phenol formaldehyde resins. After water submersion, MOR and MOE of most pMDI and phenol formaldehyde specimens were significantly reduced. All wax emulsions were also statistically similar and had no negative effect on IB strength in both pMDI and phenol formaldehyde resin. The pMDI specimens including Sample 2 in 0.8% had the highest IB value.

All wax emulsions improved dimensional stability of the specimens. Different wax types had different effects on WA and TS of the pMDI and PF specimens as noted above. the pMDI specimens with most types of wax emulsions had lower WA and TS than the phenol formaldehyde specimens under the same conditions. For pMDI, the samples were statistically similar to E-Wax. For phenol formaldehyde, Sample 2 performed best.

Regarding mechanical properties, the various wax emulsions did not exhibit differences in IB, MOR and MOE for both pMDI and phenol formaldehyde resins when compared under similar test conditions. All emulsions showed no negative effect on mechanical properties. Flexural properties MOR and MOE of the specimens significantly decreased after water submersion compared to tests performed under dry conditions. The values of WA and TS were higher when adding wax emulsions in the blending process, which indicated wax emulsions had a significant effect on the dimensional stability of the flakeboard, and better dimensional stability could be attained to reduce water uptake and thickness swelling. The results of the water absorption test also showed that most of wax emulsions performed better with pMDI than with phenol formaldehyde resin.

EXAMPLE 2

In this example, several wax emulsions according to the invention herein were prepared and compared to E-Wax. Three wax emulsions as shown in Table 2 were tested using both pMDI and phenol formaldehyde resins as adhesives in a flakeboard panel trial. Seventeen blends were formed, eight using pMDI and nine using phenol formaldehyde. The boards were pressed, and then tested in accordance with ASTM D 1037 for IB, MOR, MOE, TS and WA. IB, MOR and MOE showed minor statistically significant differences under similar testing conditions for both types of resin. MOR and MOE values were better in the 2 hour water soak in comparison to the 24 hour water soak. The pMDI resin specimens performed significantly better than the phenol formaldehyde resin specimens regardless of the wax emulsion.

At all loading levels (1.0%, 0.8% and 0.6%) Sample B performed equivalently to all other emulsions regarding IB, MOR and MOE. Sample A performed equivalently to E-Wax with respect to WA and TS at the 1.0% loading level generally used in the oriented strand board industry. At reduced loading levels, however, Sample A was equal to or better than E-Wax in WA and TS without negatively effecting IB, MOR or MOE. Additionally at reduced levels, Sample A was essentially equivalent to E-Wax which was applied at the standard 1.0% loading level.

Table 2 below lists the formulations for each composite board formulation.

TABLE 2

| Formulation Number | Weight % and Type of Resin | Weight % and Type of Wax Sample |
|---|---|---|
| 1 | 4.0% phenol formaldehyde | 1.0% E-Wax |
| 2 | | 0.8% E-Wax |
| 3 | | 0.6% E-Wax |
| 4 | | 1.0% Sample A |
| 5 | | 0.8% Sample A |
| 6 | | 0.6% Sample A |
| 7 | | 1.0% Sample B |
| 8 | | 1.0% Sample C |
| 9 | 2.5% pMDI | 1.0% E-Wax |
| 10 | | 0.8% E-Wax |
| 11 | | 0.6% E-Wax |
| 12 | | 1.0% Sample A |
| 13 | | 0.8% Sample A |
| 14 | | 0.6% Sample A |
| 15 | | 1.0% Sample B |
| 16 | | 1.0% Sample C |
| 17 | | 1.0% Sample A (premixed with resin) |

Table 3 below summarizes the statistical results and comparisons in the phenol formaldehyde resin groups and Table 4 summarizes the statistical results and comparisons for the pMDI resin groups.

TABLE 3

| | Property/Formulation Number | | | | | | | |
|---|---|---|---|---|---|---|---|---|
| | 1 | 2 | 3 | 4 | 5 | 6 | 7 | 8 |
| IB | A | A | A | A | A | A | A | A |
| MOR | A | A | A | A | A | A | A | A |
| MOE | A | A | A | A | A | A | A | A |
| 2 hour TS | B | D | D | ABC | BCD | CD | A | AB |
| 24 hour TS | CD | D | D | C | CD | D | A | B |
| 2 hour WA | ABC | C | C | AB | AB | BC | A | A |
| 24 hour WA | AB | B | B | AB | AB | B | A | AB |

TABLE 4

| | Property/Formulation Number | | | | | | | | |
|---|---|---|---|---|---|---|---|---|---|
| | 9 | 10 | 11 | 12 | 13 | 14 | 15 | 16 | 17 |
| IB | A | A | A | A | A | A | A | A | A |
| MOR | A | A | A | A | A | A | A | A | A |
| MOE | AB | ABC | C | AB | A | AB | AB | AB | B |
| 2 hour TS | AC | C | C | BC | AC | AB | A | AC | C |
| 24 hour TS | A | A | B | A | A | A | A | A | A |
| 2 hour WA | A | AB | B | A | A | A | A | A | A |
| 24 hour WA | A | AB | C | A | AB | AB | A | AB | AB |

As in Example 1, the flakes used as the lignocellulosic material were quaking aspen having a 97% by weight solid content from LP Company. The pMDI resin was from Huntsman and the phenol formaldehyde was from Dynea. E-Wax as in Example 1 was used in this Example having a 58% solids content. Samples A-C had the formulations shown below in Table 5:

TABLE 5

| Component | Sample A | Sample B* | Sample C |
|---|---|---|---|
| Water | 42 | 49.78 | 49.78 |
| Polyvinyl Alcohol | 2.5 | 2.0 | 2.0 |
| Potassium Hydroxide | — | 0.5 | 0.5 |
| Polyfon ® H | 1.0 | 0.42 | 0.42 |
| Paraffin Wax | — | 43 | — |
| Indrawax ® 033 (Slack Wax) | 54.5 | — | 43 |
| Montan Wax | — | 4.3 | 4.3 |
| Solids Content (wt %) | 58 | 50 | 50 |

*Aqualite 72 from Henry Company

Flakeboard specimens were made with two pMDI and phenol formaldehyde resins as alternative base resin adhesives and four wax emulsions (Samples A-C and E-Wax noted above). Furnish was blended using a spinning disk atomizer and formed using a 24 in square platen press. The specimens were evaluated through standard physical property tests as noted above. Every wax emulsion was added to the flakes separately by spinning disk atomizer in a laboratory rotating drum blender system after one of the two resins were applied to the flakes. The phenol formaldehyde resin was formulated in an aqueous solution so that the moisture content of the blended furnish varied between the two resins (3.5% for pMDI and 3.0% for phenol formaldehyde). The resin application rate of the phenol formaldehyde was 4.0% and for pMDI was 2.5, based on the oven-dry weight. Most of the wax emulsions were applied to the flakes at 1.0% solids content, based on flake oven-dry weight. The exceptions for wax coverage for E-wax and Sample A were 0.8 and 0.6% by weight solids content by dry flake weight. In addition, a 1.0 wt % wax emulsion using Sample A was premixing with pMDI resin and applied to the flakes in admixed form. The 17 samples including the controls using E-Wax were examined at a panel target density of 40 lbs/ft3. Three panels (replications) of 24 in×24 in (0.5 in target thickness) per formulation were produced through hand lay-up of the flakes into a random mat using a fixed frame deckle box on a metal caul plate, followed by compressing the mat to stops between two manually controlled, electronic-heated platens of a hydraulic hot press from 0 to 255 minutes varying from 0 to about 1400 psi. After pressing, 53 panels were cut into test specimens and dry-conditioned at a relative humidity of 65±2% and a temperature of 68±6° F. for 2 weeks.

Statistically, there were no differences resulting from the different wax emulsions on the MOR or MOE in both resin systems as summarized in Tables 3 and 4 above. There was some statistical difference within the MOE data in the pMDI group. There was no statistical difference between wax formulations within the two resin systems, however the pMDI specimens had higher IB strength than the phenol formaldehyde specimens. The WA and TS of all pMDI specimens with wax emulsions were lower than those of phenol formaldehyde specimens after 2 hours and 24 hours submersions in water. For both resin systems, the WA and TS showed increased values between 2 hour and 24 hour water submersion, and the increased values among pMDI specimens were lower than those among the phenol formaldehyde specimens. Within the pMDI resin samples, the WA and TS of the specimens including Samples A-C were statistically similar to or better than the E-Wax samples. Within the phenol formaldehyde resins samples, Samples 7 and 8 were statistically lower WA and TS values compared to those of the other groups with different wax formulations after both 2 and 24 hour water submersions. All properties of the specimens formed using the premixed resin (formed using Sample 17) indicated that premixing pMDI resin and wax emulsion together is a reasonable way to apply these materials in the flakeboard production process.

The wax emulsions described herein demonstrate compatibility with resins used in the manufacture of composite boards such as oriented strand board, including pMDI and phenol formaldehyde. The wax emulsions when admixed with such resins in the laboratory resist separation of wax from the mixture. Admixtures of Sample A from Example 2 above were pumped into a spinning disc atomizer and sprayed onto the wood chips which are used to make oriented strand board. The line did not plug, and there was no visual separation of wax from the mixture. Wax did not accumulate on the spinning disc atomizer. Subsequent testing of resulting oriented strand boards showed virtually no difference in performance when compared to oriented strand board produced by spraying the wax emulsion and resin separately.

Based on the foregoing, it can be seen that the wax emulsions described herein allow for wood chips or other lignocellulosic materials to receive a resin/wax emulsion mixture simultaneously. It is believed that this will provide better and more thorough distribution of wax and resin in the oriented strand board from simultaneous application of the wax emulsion and resin component in admixture. Without wishing to be bound by theory, it is believed that such better distribution would provide better hydrophobing performance.

Further, but using these components in admixture, 1-2 less spraying apparatus would be required in most oriented strand board processes with similar advantages in other composite board processes. Currently most wood chip application drums have 6-7 spray systems.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A wax emulsion for manufacture of a composite board, comprising (a) water;

(b) a lignosulfonic acid or a salt thereof;

(c) at least one wax selected from the group consisting of slack wax and montan wax, wherein the slack wax contains up to 20% oil by weight; and (d) polyvinyl alcohol.

2. The wax emulsion according to claim 1, wherein the solids content of the wax emulsion is about 40% to about 70% by weight of the emulsion.

3. The wax emulsion according to claim 1 wherein the at least one wax comprises slack wax.

4. The wax emulsion according to claim 1, wherein the at least one wax comprises slack wax and montan wax.

5. The wax emulsion according to claim 1, wherein the emulsion comprises water in an amount of about 30% to about 60% by weight of the emulsion.

6. The wax emulsion according to claim 1, wherein the emulsion comprises polyvinyl alcohol in an amount of 0.1% to about 5% by weight of the emulsion.

7. The wax emulsion according to claim 1, further comprising potassium hydroxide.

8. The wax emulsion according to claim 7, wherein the emulsion comprises potassium hydroxide in an amount of about 0.1% to about 1% by weight of the emulsion.

9. The wax emulsion according to claim 1, wherein the emulsion comprises lignosulfonic acid or a salt thereof in an amount of about 0.1% to about 5% by weight of the emulsion.

10. The wax emulsion according to claim 1, wherein the emulsion comprises the at least one wax in an amount of about 40% to about 60% by weight of the emulsion.

11. A wax emulsion for manufacture of a composite board, comprising (a) water;

(b) a lignosulfonic acid or a salt thereof;

(c) potassium hydroxide;

(d) polyvinyl alcohol; and (e) at least one wax selected from the group consisting of slack wax and montan wax wherein the slack wax contains up to 20% oil by weight.

12. The wax emulsion according to claim 11, wherein the at least one wax comprises slack wax.

13. The wax emulsion according to claim 11, wherein the at least one wax comprises montan wax and paraffin wax.

14. The wax emulsion according to claim 11, wherein the at least one wax comprises slack wax and montan wax.

15. A wax emulsion for manufacture of a composite board, comprising:

(a) about 30% to about 60% by weight of water;

(b) about 0.1% to about 5% by weight of a lignosulfonic acid or a salt thereof;

(c) about 0% to about 1% by weight of potassium hydroxide;

(d) about 40% to about 50% by weight of slack wax wherein the slack wax contains up to 20% oil by weight; and (e) about 0.1% to about 10% montan wax.

16. The wax emulsion according to claim 15, further comprising about 0.1% to about 5% of polyvinyl alcohol.

17. A formulation for forming a composite board, comprising:

(a) a lignocellulosic material;

(b) a wax emulsion comprising water; a lignosulfonic acid or a salt thereof; and at least one wax selected from the group consisting of slack wax and montan wax wherein the slack wax contains up to 20% oil by weight;

(c) at least one resin selected from the group consisting of urea-formaldehyde, phenol-formaldehyde, melamine-urea-formaldehyde, melamine-formaldehyde resins, polymeric isocyanates and combinations, copolymers and derivatives thereof; and (d) polyvinyl alcohol.

* * * * *